(12) United States Patent
Mettler

(10) Patent No.: US 10,661,697 B2
(45) Date of Patent: May 26, 2020

(54) VEHICLE-MOUNTABLE CARGO CARRIER FOR PORTABLE RUMBLE STRIPS

(71) Applicant: Plastic Safety Systems, Inc., Cleveland, OH (US)

(72) Inventor: Charles M. Mettler, Perry, OH (US)

(73) Assignee: Plastic Safety Systems, Inc., Cleveland, OH (US)

( * ) Notice: Subject to any disclaimer, the term of this patent is extended or adjusted under 35 U.S.C. 154(b) by 371 days.

(21) Appl. No.: 15/090,968

(22) Filed: Apr. 5, 2016

(65) Prior Publication Data

US 2017/0282779 A1     Oct. 5, 2017

(51) Int. Cl.
| | |
|---|---|
| *B60R 9/06* | (2006.01) |
| *B60P 3/40* | (2006.01) |
| *E01F 9/529* | (2016.01) |
| *E01F 9/70* | (2016.01) |

(52) U.S. Cl.
CPC ...... *B60P 3/40* (2013.01); *B60R 9/06* (2013.01); *E01F 9/529* (2016.02); *E01F 9/70* (2016.02)

(58) Field of Classification Search
CPC ... B60P 3/40; B60R 9/06; B60R 9/065; E01F 9/0529
See application file for complete search history.

(56) References Cited

U.S. PATENT DOCUMENTS

| | | | | |
|---|---|---|---|---|
| 2,859,887 A | * | 11/1958 | Haight .................... | B60R 9/042 193/42 |
| 3,521,799 A | * | 7/1970 | Rundel ..................... | B60R 9/06 224/493 |
| 4,390,117 A | * | 6/1983 | Fagan .................... | B60R 9/0485 182/127 |
| 5,439,113 A | * | 8/1995 | Elvin-Jensen ......... | B65D 19/04 206/509 |
| 6,179,184 B1 | | 1/2001 | Belinky et al. | |
| 7,246,733 B2 | * | 7/2007 | Threet ...................... | B60R 9/06 224/498 |
| 7,347,390 B2 | * | 3/2008 | Truan ................... | A01C 15/005 224/495 |
| 7,806,308 B2 | * | 10/2010 | Gunn ....................... | B60R 9/06 224/512 |
| 2003/0226867 A1 | * | 12/2003 | Knizner .................... | B60R 9/06 224/521 |
| 2006/0151555 A1 | * | 7/2006 | Mills ........................ | B60R 9/06 224/509 |
| 2015/0030390 A1 | | 1/2015 | Brown et al. | |

* cited by examiner

*Primary Examiner* — Corey N Skurdal
(74) *Attorney, Agent, or Firm* — Renner, Otto, Boisselle & Sklar, LLP

(57) ABSTRACT

A cargo carrier for portable rumble strips is mountable to a hitch assembly for a vehicle. The cargo carrier includes a basket configured to receive and retain a portable rumble strip for storage and transport, and a mounting assembly that includes a pintle adapted to be received in a receiver of a hitch assembly mountable to a vehicle. The basket has a frame that includes frame elements that define a bottom wall, relatively long front and back walls, and relatively short side walls that connect the front wall and the back wall. The front, back, and side walls extend from respective sides of the bottom wall in a common direction. And the basket further includes a rotating element at the top of at least one of the side walls to facilitate drawing rumble strips lengthwise over the side wall into or out of the basket.

9 Claims, 19 Drawing Sheets

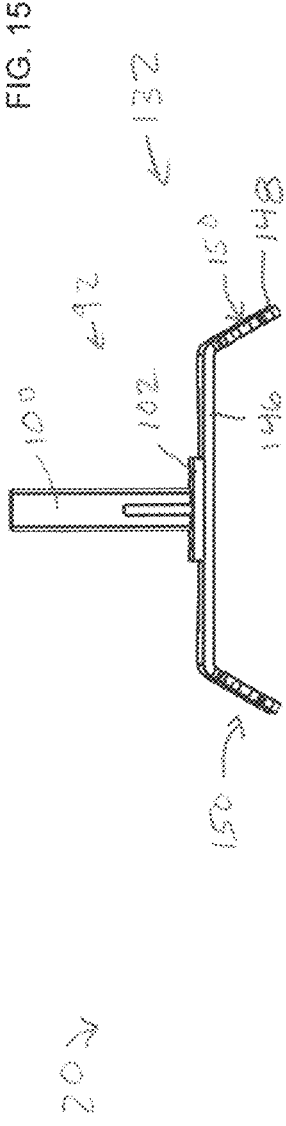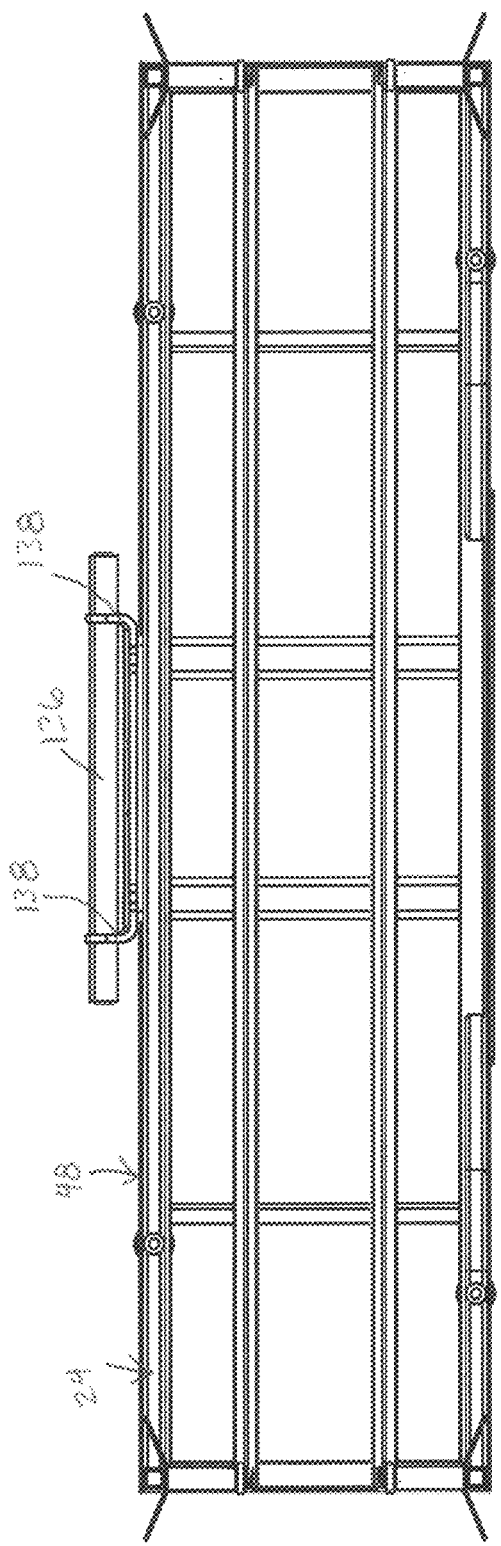

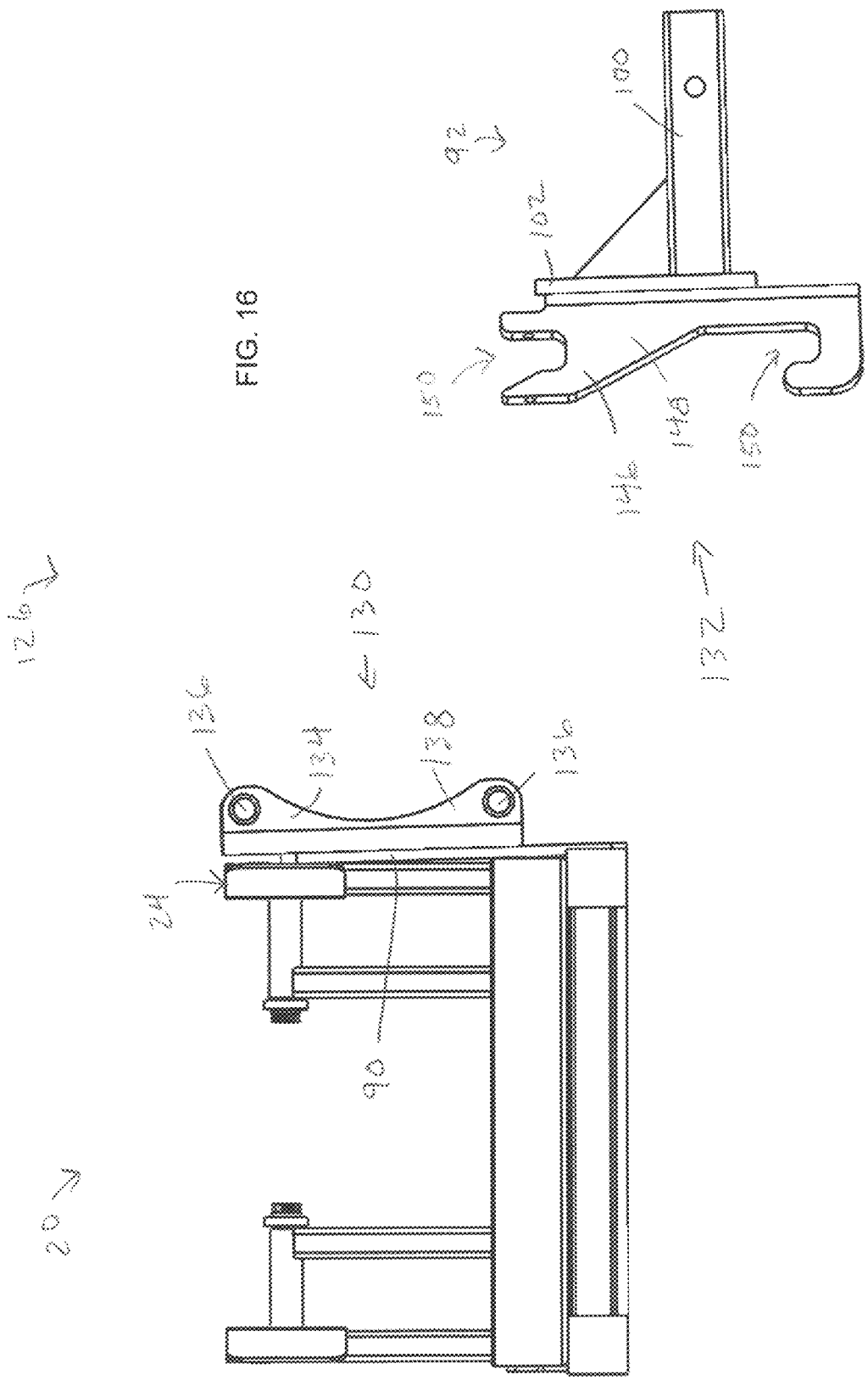

VEHICLE-MOUNTABLE CARGO CARRIER FOR PORTABLE RUMBLE STRIPS

FIELD OF THE INVENTION

The invention relates to cargo carriers for vehicles and, in particular, to a hitch-mounted cargo carrier designed to receive a portable roadway warning device.

BACKGROUND

Vehicles may be supplied with a receiver mounted to the frame of the vehicle to receive a hitch for purposes of towing another vehicle. The receiver also may be used to provide additional cargo-carrying capacity, such as a rack for bicycles or to provide additional luggage-carrying capacity.

Separately, roadway warning devices, specifically the roadway warning devices commonly referred to as rumble strips, provide a perceptible noise and warning vibration when automotive vehicles, including both passenger vehicles and trucks, drive over the rumble strips. The noise and vibration is intended to warn the vehicle driver of an approaching condition that requires a lower speed or special attention, such as a work site, construction site, slow speed zone, checkpoint, toll booth, and so on, without alarming the driver and without adversely affecting the stability of the vehicle. Some types of rumble strips are intended to be permanently installed for long-term use, while others are intended to be portable for temporary use at work zones and other applications of relatively short duration. Portable rumble strips should be reusable, and also should be quick and easy to deploy and remove. Portable rumble strips also should have the ability to remain in place under heavy traffic, including heavy trucks at highway speeds.

SUMMARY OF THE INVENTION

Portable rumble strips often require multiple sections to span a lane of traffic, and each section may be relatively heavy, making it difficult for one person to lift each section without assistance. Because these portable rumble strips are temporary and often are deployed on working roadways, users must transport the rumble strips to and from the work site and quickly deploy the rumble strips onto the roadway with minimal exposure of the workers to traffic on the roadway. The present invention provides a modified vehicle-mounted cargo carrier that facilitates storing, transporting, deploying, and retrieving portable rumble strips.

More particularly, the present invention provides a cargo carrier for portable rumble strips that is mountable to a receiver of a hitch assembly mountable to a vehicle. The cargo carrier includes a basket configured to receive and retain one or more portable rumble strips for storage and transport, and a mounting assembly that includes a pintle bracket connectable to the basket. The basket includes a frame that defines a volume for receiving one or more rumble strips. The frame includes one or more frame elements that define a bottom wall, a relatively long front wall, a relatively long back wall, and relatively short laterally-spaced side walls that connect the front wall and the back wall. The front wall, the back wall, and the side walls extend from respective sides of the bottom wall in a common direction. The pintle bracket includes a pintle adapted to be received in a receiver of a hitch assembly mountable to a vehicle. And the basket may further include one or more rotating elements at the top of at least one of the side walls to facilitate drawing rumble strips lengthwise over the at least one side wall into or out of the basket.

The present invention also provides a cargo carrier for portable rumble strips that is mountable to a receiver of a hitch assembly mountable to a vehicle. The cargo carrier includes a basket configured to receive and retain one or more portable rumble strips for storage and transport, and a mounting assembly to mount the basket to a vehicle. The basket includes a frame. The frame defines a volume and includes one or more frame elements that define a bottom wall, a relatively long front wall, a relatively long back wall, and relatively short side walls that connect the front wall and the back wall. The front wall, the back wall, and the side walls extend from respective sides of the bottom wall in a common direction. The mounting assembly includes a pintle bracket removably connectable to the basket. The pintle bracket includes a pintle adapted to be received in a receiver of a hitch assembly mountable to a vehicle. And the mounting assembly is configured to selectively adjust the height of the basket relative to the pintle.

The mounting plate may have a plurality of vertically-spaced openings, and the pintle bracket may include a pintle mounting plate attached to the pintle, where the pintle mounting plate includes at least one opening, such that the opening in the pintle mounting plate is selectively alignable with one of the plurality of openings in the basket mounting plate and is securably fastenable with a fastener receivable in the aligned openings, whereby the basket mounting plate and the pintle mounting plate are securable together at any one of multiple vertically-displaced positions to vary the height of the basket relative to pintle.

The mounting assembly may include a catch plate mounted to the basket mounting plate, the catch plate having a horizontal catch bar parallel to the back wall of the basket, and the pintle bracket may include one or more catches adapted to receive and hold the catch bar to secure the basket to the pintle bracket.

The present invention further provides a cargo carrier for portable rumble strips that is mountable to a receiver of a hitch assembly mountable to a vehicle. The cargo carrier includes a basket configured to receive and retain one or more portable rumble strips for storage and transport, and a mounting assembly to mount the basket to a vehicle. The basket includes a frame. The frame defines a volume and includes one or more frame elements that define a bottom wall, as well as one or more frame elements that define a relatively long front wall, a relatively long back wall, and relatively short side walls that connect the front wall and the back wall. The front wall, the back wall, and the side walls extend from respective sides of the bottom wall in a common direction. The mounting assembly includes a pintle bracket connectable to the basket. The pintle bracket includes a pintle adapted to be received in a receiver of a hitch assembly mountable to a vehicle. And the basket may further include a pair of spaced-apart guide wings positioned toward the front and back walls that extend above the adjacent side wall to help guide rumble strips lengthwise over the side wall into or out of the basket.

Any cargo carrier provided by the invention may further include one or more of the following features, separately or in combination, if not already present: (1) the one or more rotating elements at the top of at least one of the side walls may include stainless steel rollers; (2) the one or more rotating elements at the top of at least one of the side walls may include a pair of spaced apart rollers; (3) the side walls may include relieved portions that facilitate reaching into the basket to grasp an end of a rumble strip; (4) the basket may include a pair of spaced-apart guide wings positioned toward the front and back walls that extend above the adjacent side wall to help guide rumble strips lengthwise over the side wall into or out of the basket; (5) the basket may include features that facilitate stacking baskets for storage when not mounted on a vehicle, and these features that facilitate stacking may include feet mounted to a bottom wall of the basket and corresponding locating elements on a top side of the basket to receive the feet of another rumble strip carrier; and (6) the front wall of the basket may be relieved in a central portion to facilitate lifting rumble strips over the front wall and into or out of the basket.

Other features and advantages of the invention will be apparent from the following detailed description with reference to the accompanying drawings.

BRIEF DESCRIPTION OF THE DRAWINGS

In the accompanying drawings and description, the same or similar reference characters are used to refer to the same or similar features shown in different figures.

FIG. 15 is a top view of the rumble strip cargo carrier and mounting assembly of FIG. 13.

FIG. 16 is a side elevation view of the rumble strip cargo carrier and mounting assembly of FIG. 13.

DETAILED DESCRIPTION

Figure 1:
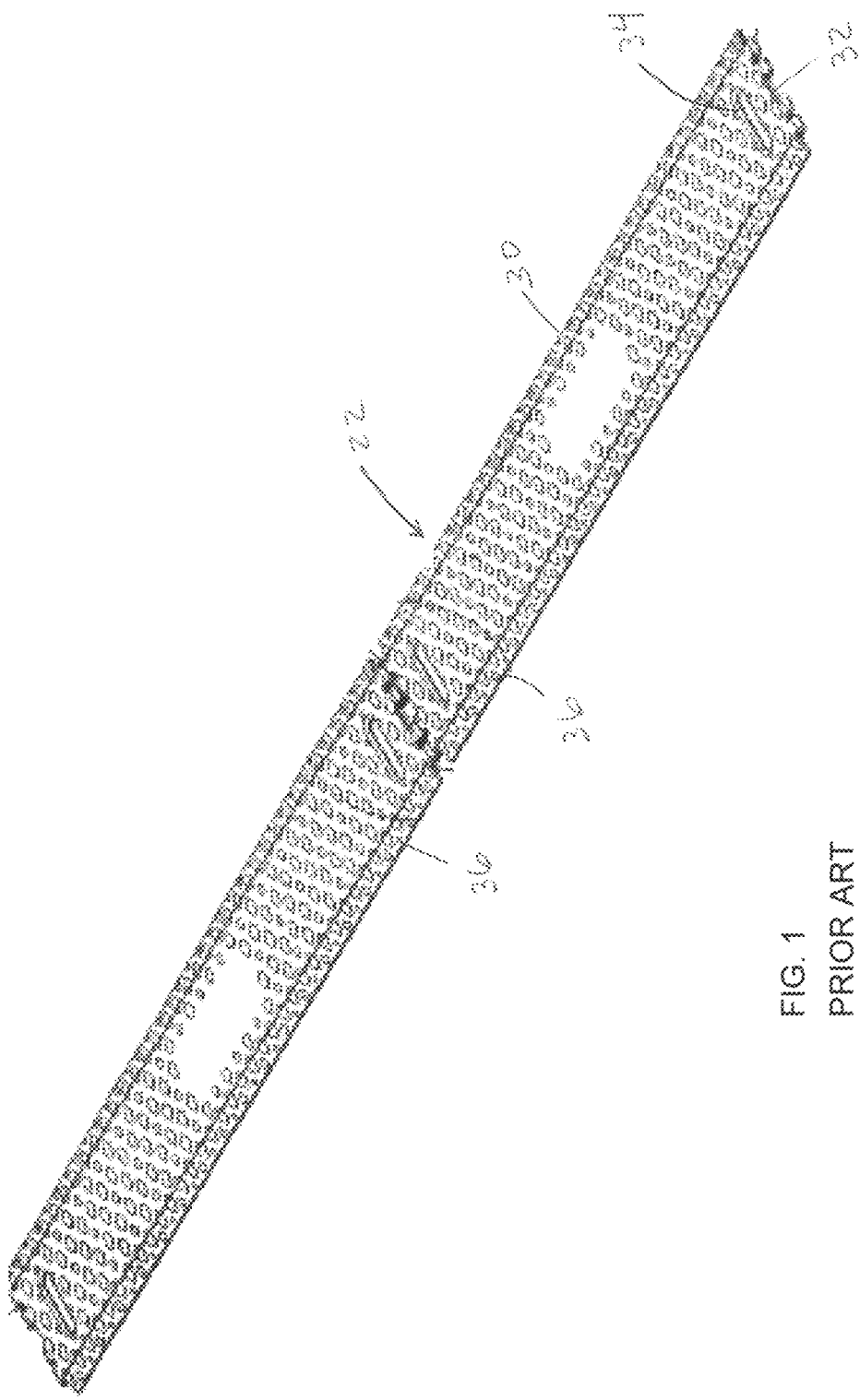
FIG. 1 is a perspective view of an exemplary prior art rumble strip.
Figure 2:
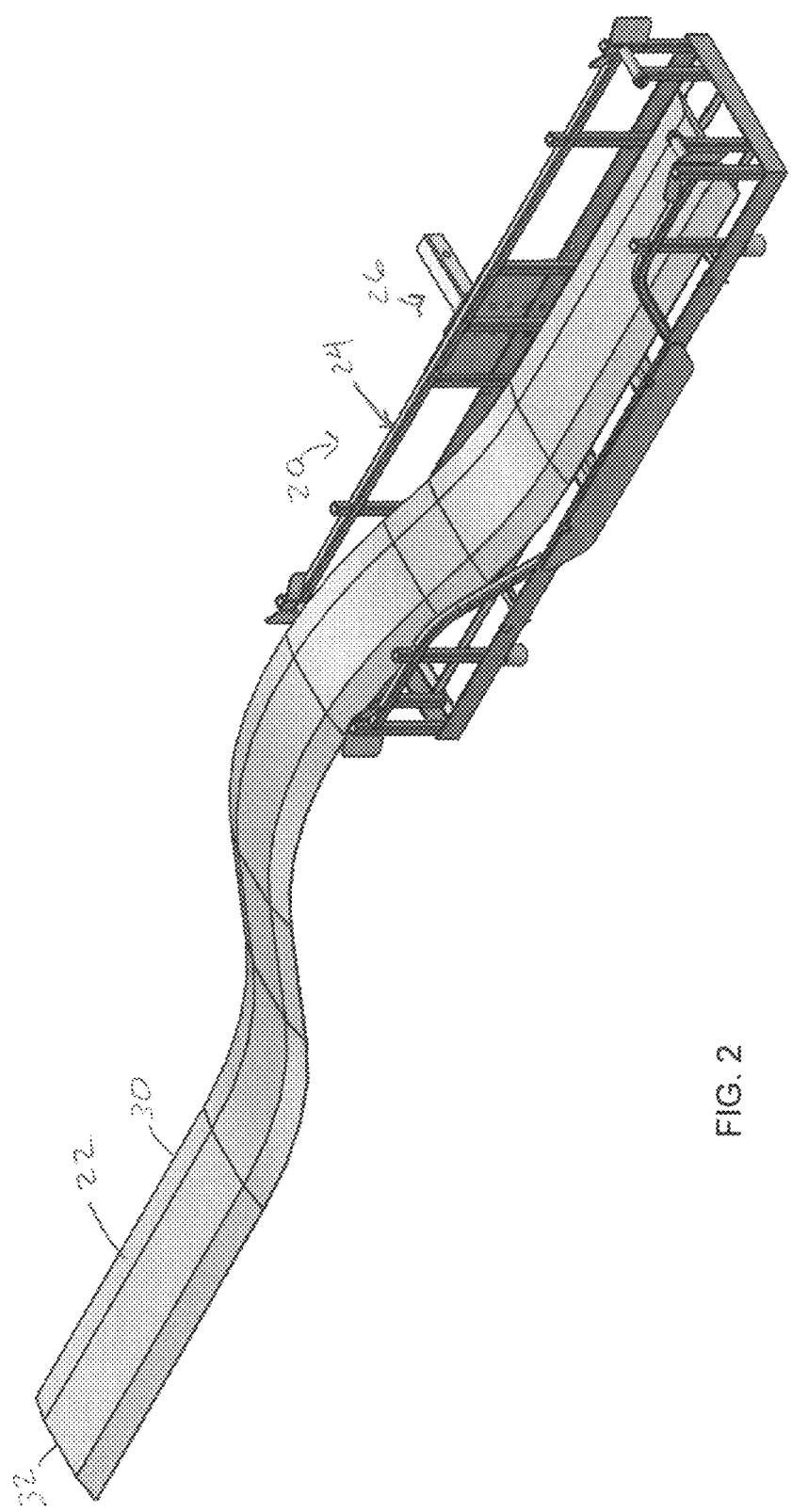
FIG. 2 is a top perspective view of a rumble strip cargo carrier and mounting assembly provided by the invention with a schematic illustration of a rumble strip to illustrate the cargo carrier in use.
Figure 3:
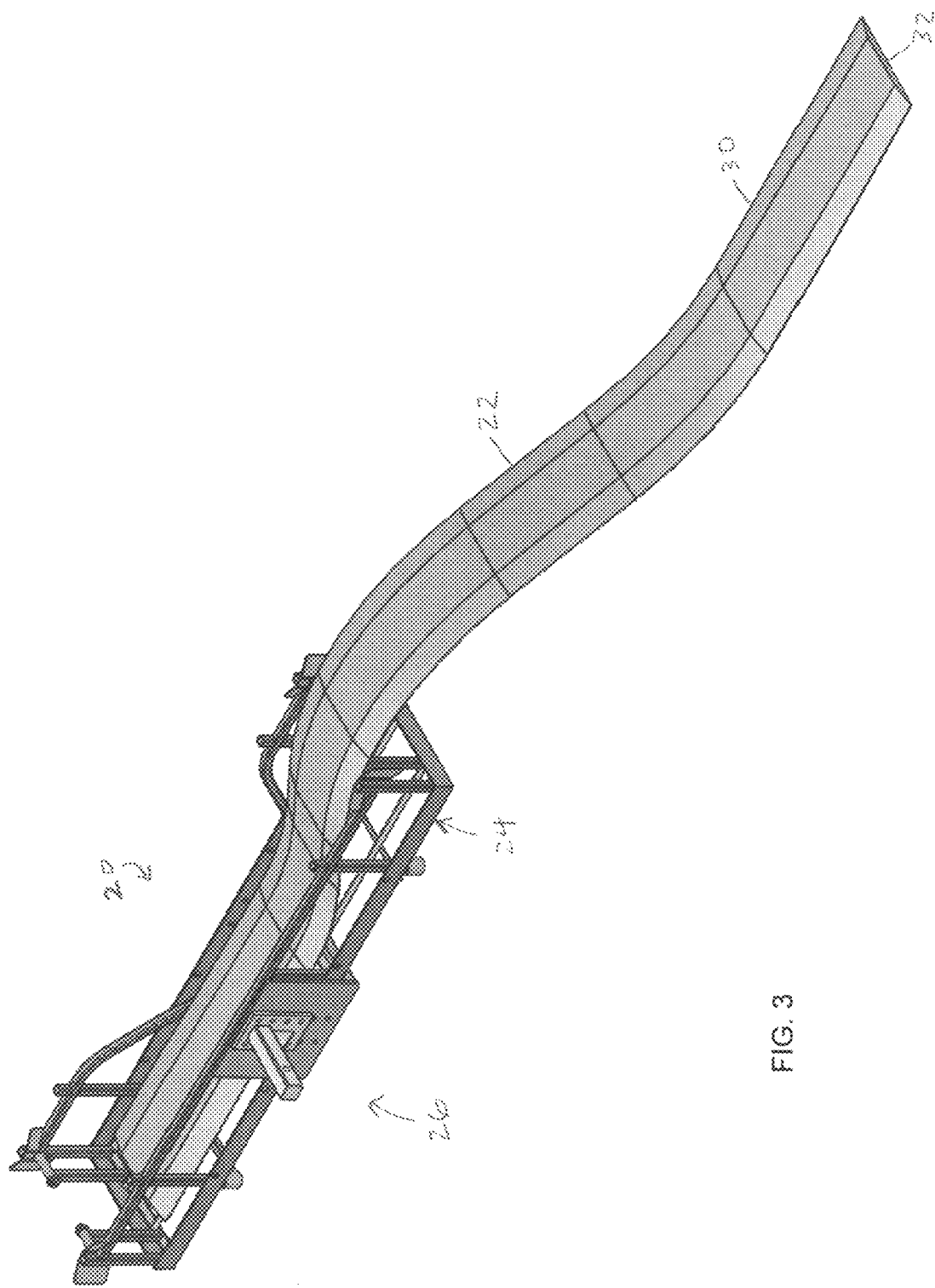
FIG. 3 is a rear perspective view of the rumble strip cargo carrier and mounting assembly of FIG. 2.
Figure 4:
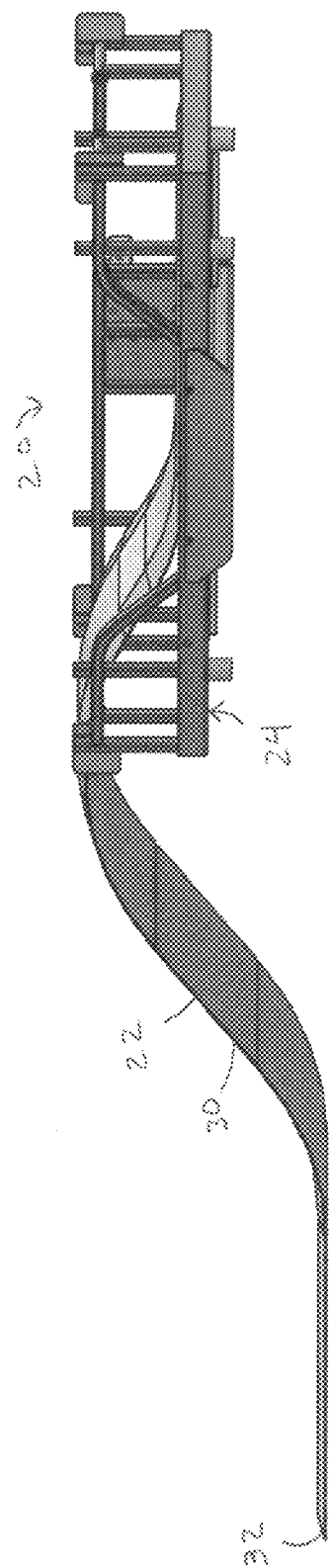
FIG. 4 is a front perspective view of the rumble strip cargo carrier and mounting assembly of FIG. 2.
Figure 5:
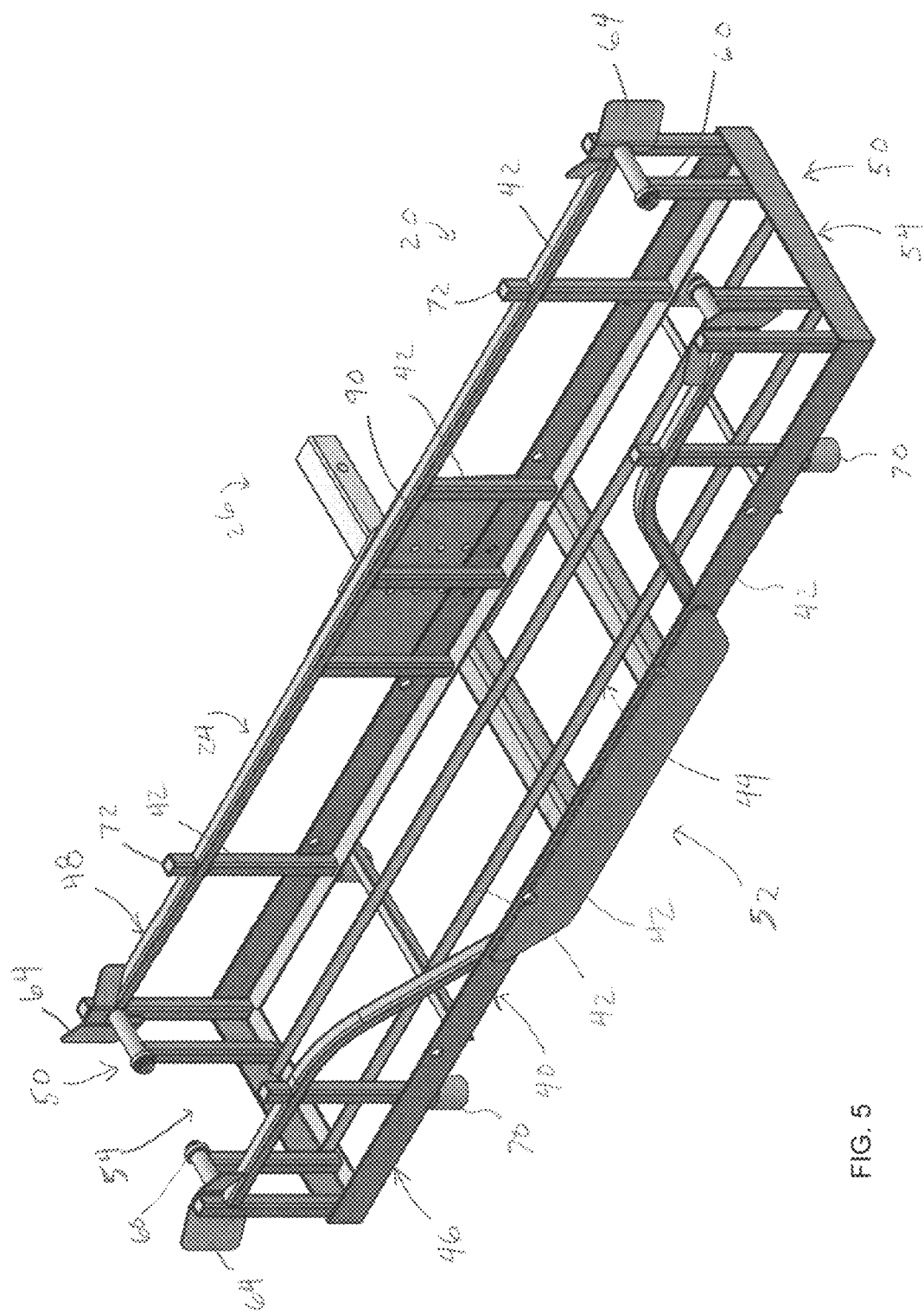
FIG. 5 is a front perspective view of the rumble strip cargo carrier of FIG. 2.
Figure 6:
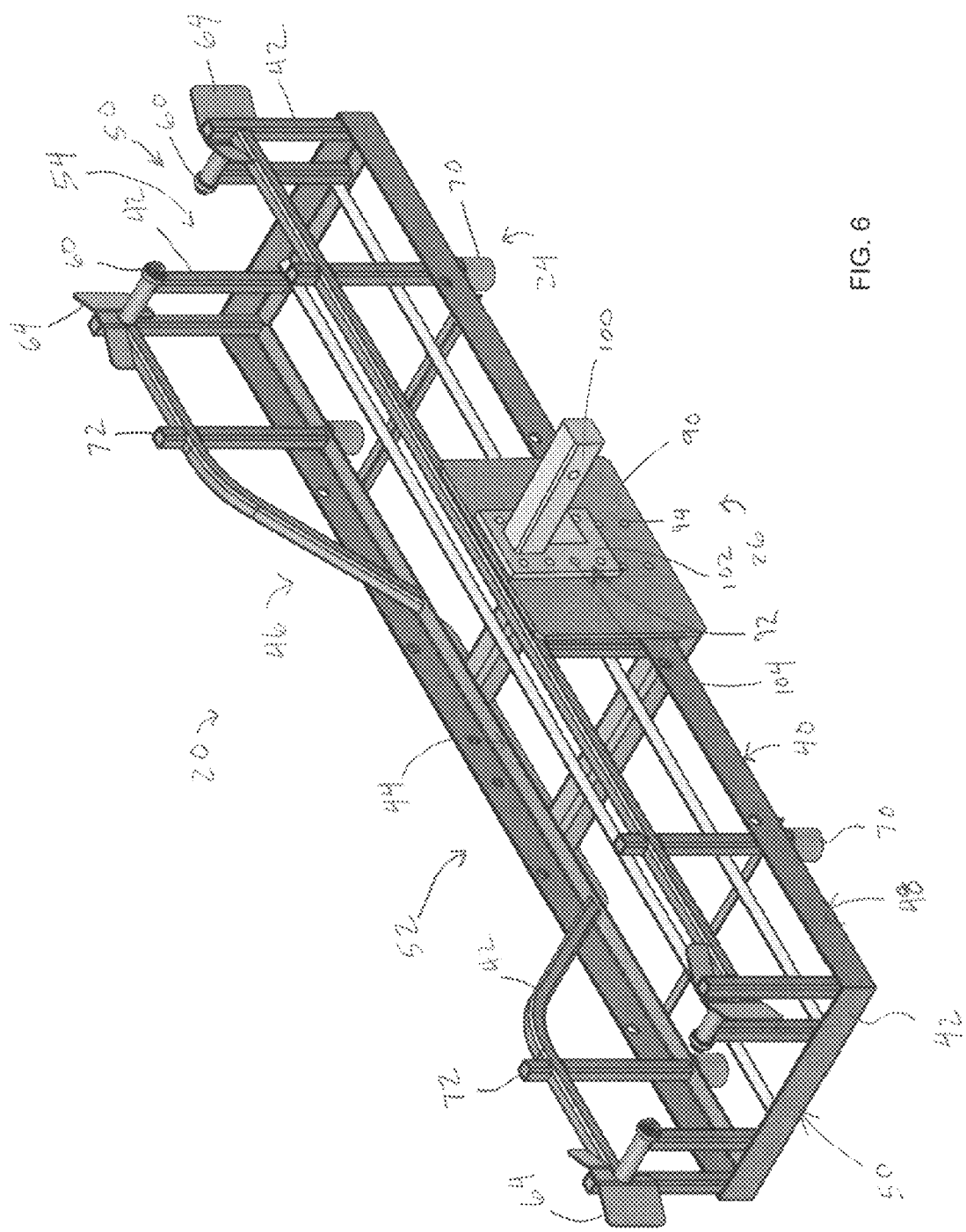
FIG. 6 is a rear perspective view of the rumble strip cargo carrier and mounting assembly of FIG. 5.
Figure 7:
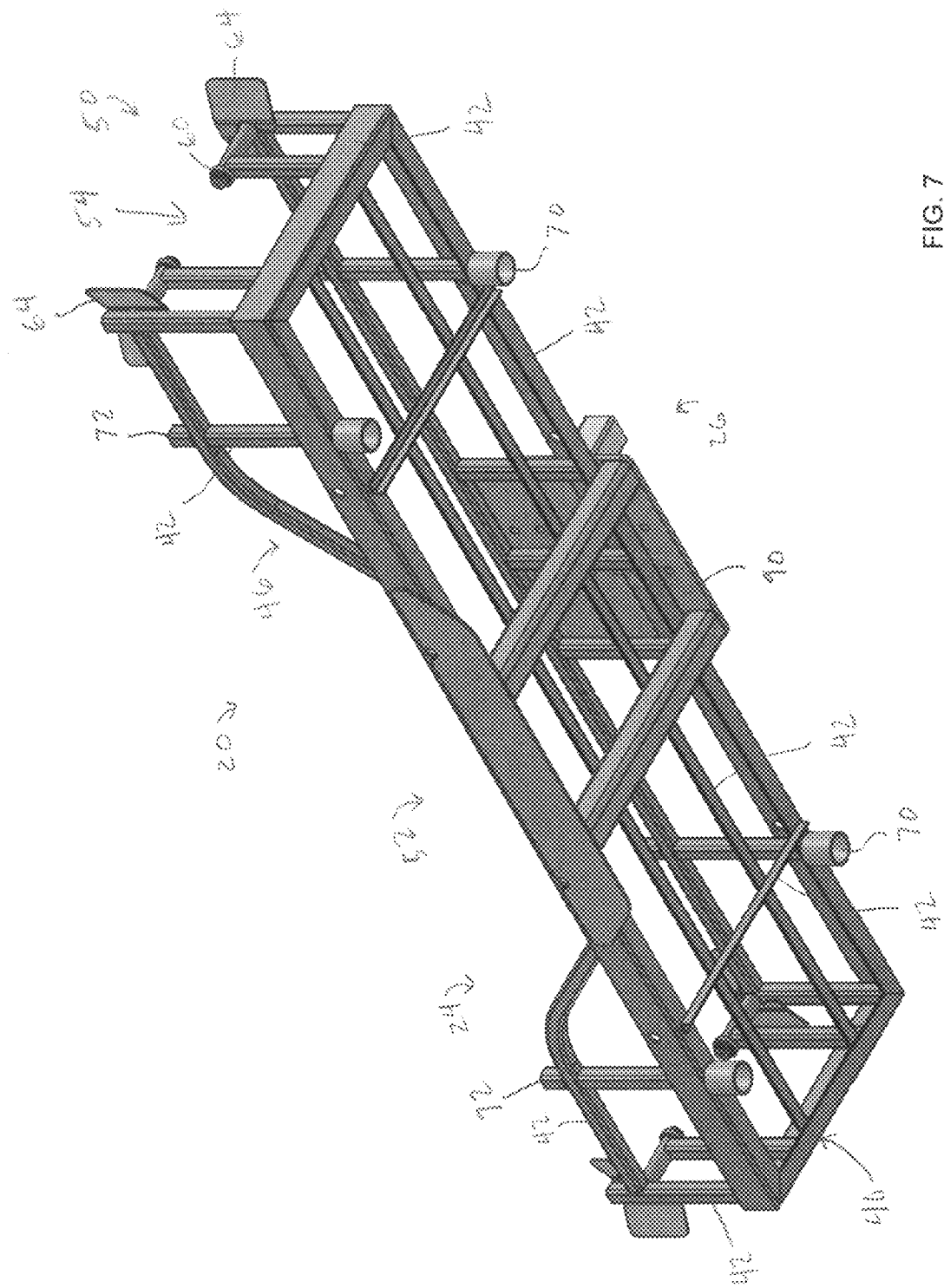
FIG. 7 is a bottom perspective view of the rumble strip cargo carrier and mounting assembly of FIG. 5.
Figure 8:
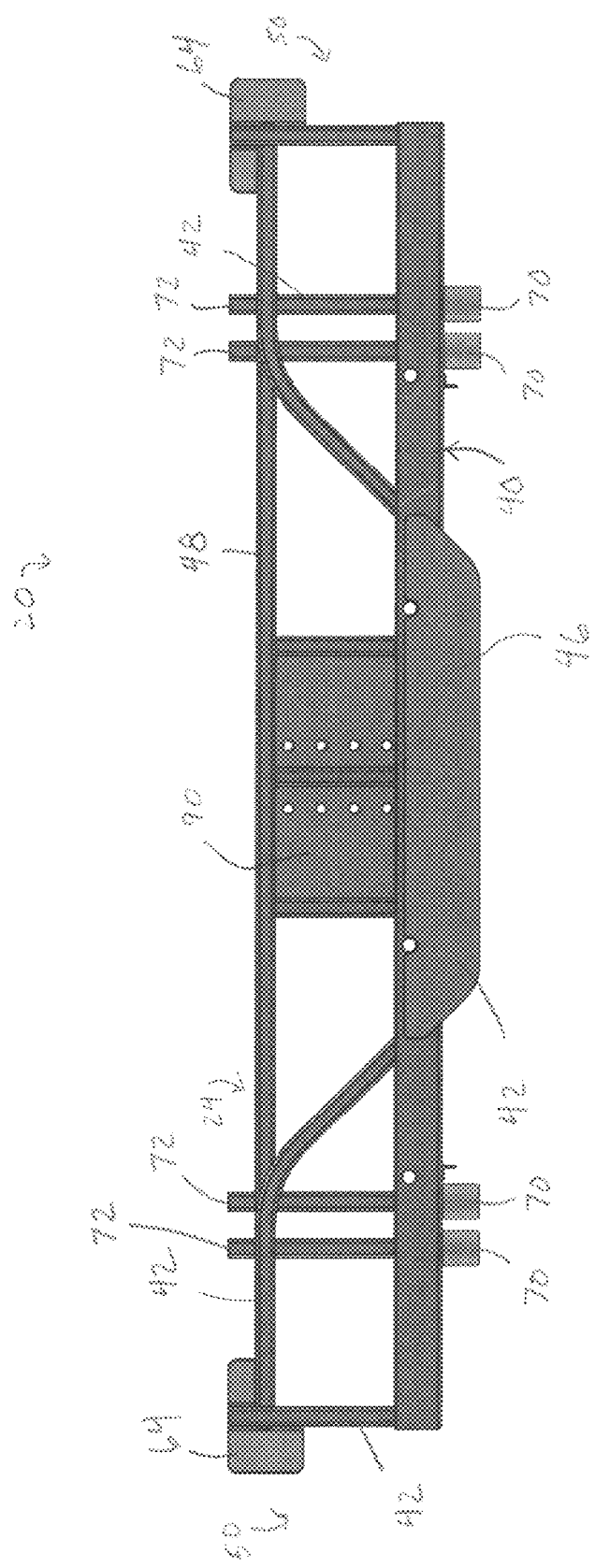
FIG. 8 is a front elevation view of the rumble strip cargo carrier and mounting assembly of FIG. 5.
Figure 9:
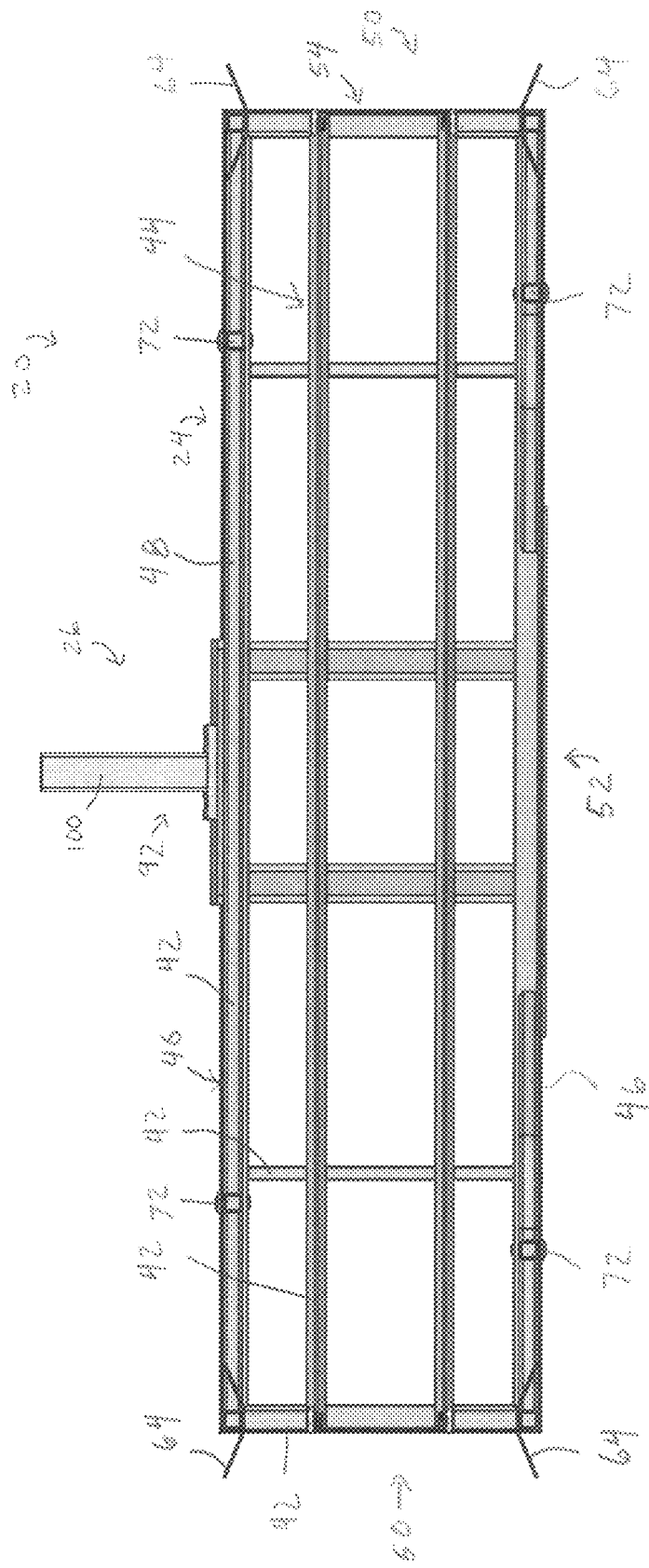
FIG. 9 is a top view of the rumble strip cargo carrier and mounting assembly of FIG. 5.
Figure 10:
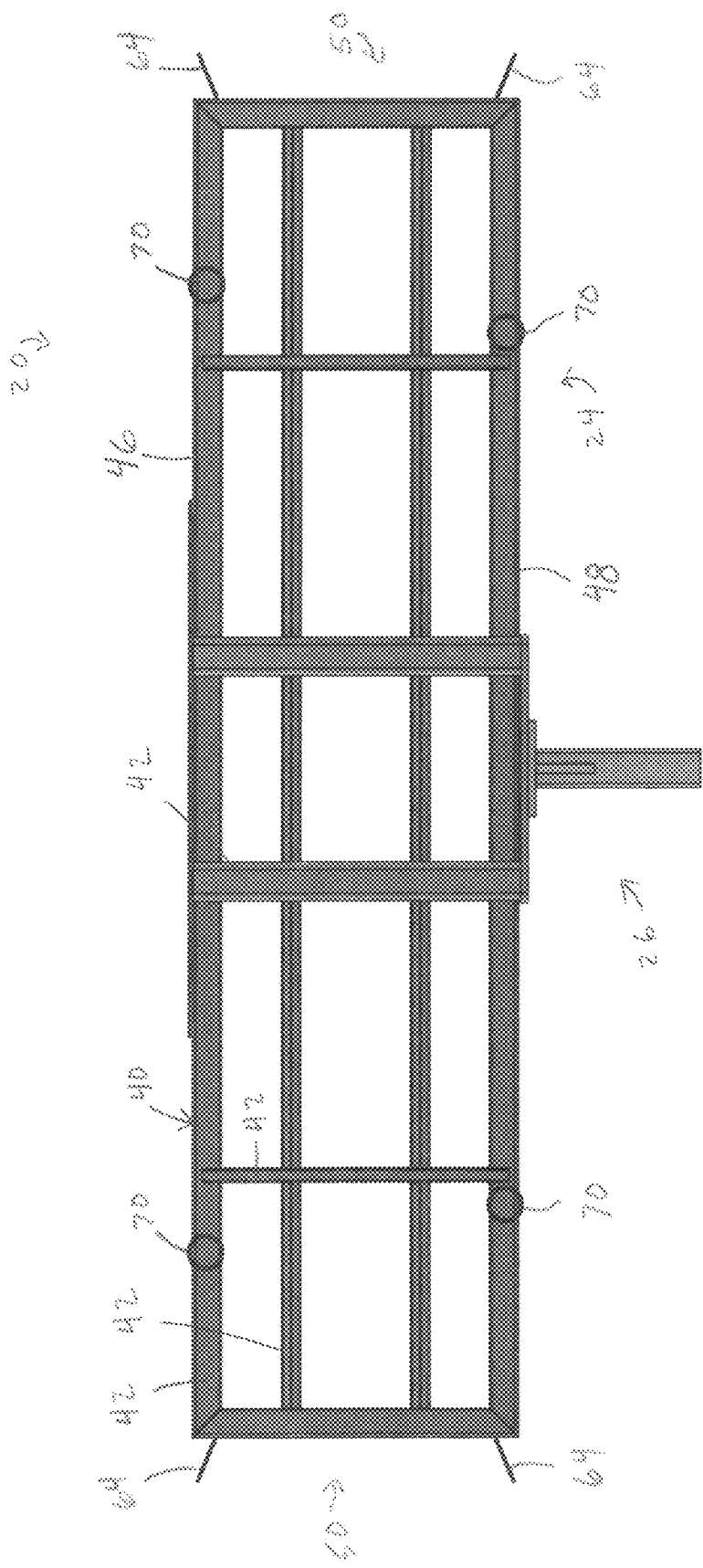
FIG. 10 is a bottom view of the rumble strip cargo carrier and mounting assembly of FIG. 5.
Figure 11:
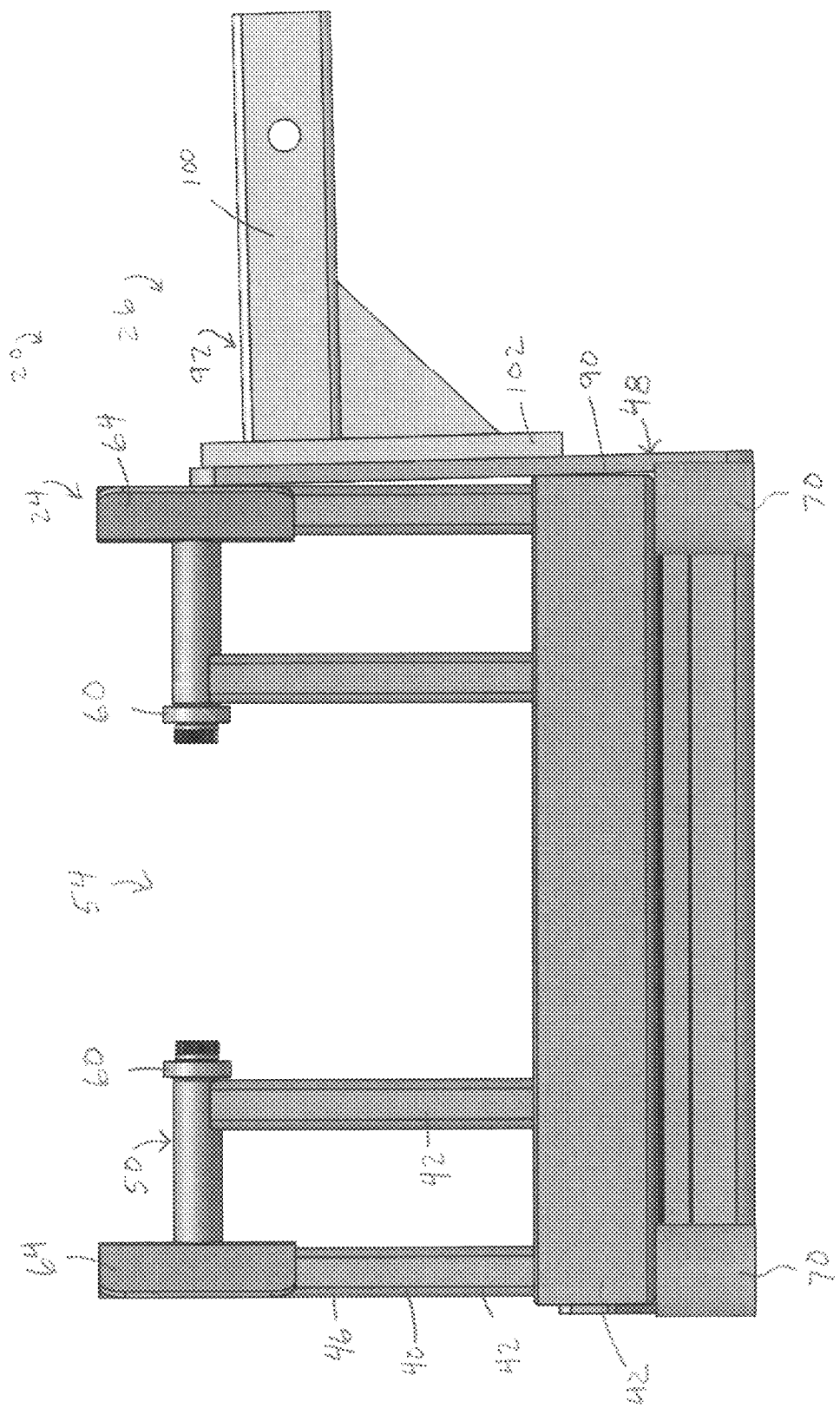
FIG. 11 is a side view of the rumble strip cargo carrier and mounting assembly of FIG. 5.
Figure 12:
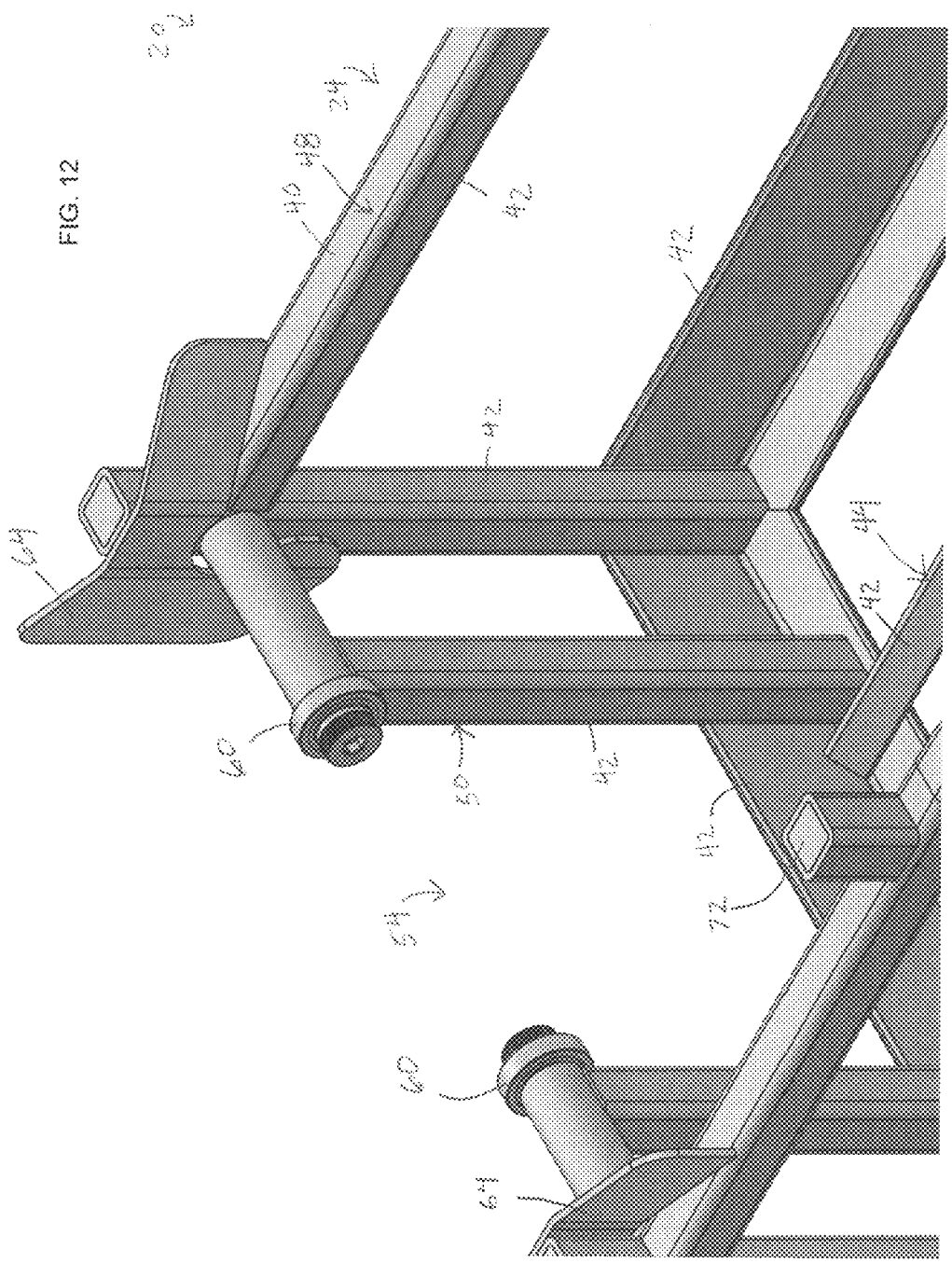
FIG. 12 is enlarged perspective view of a portion of the rumble strip cargo carrier of FIG. 5.
Figure 13:
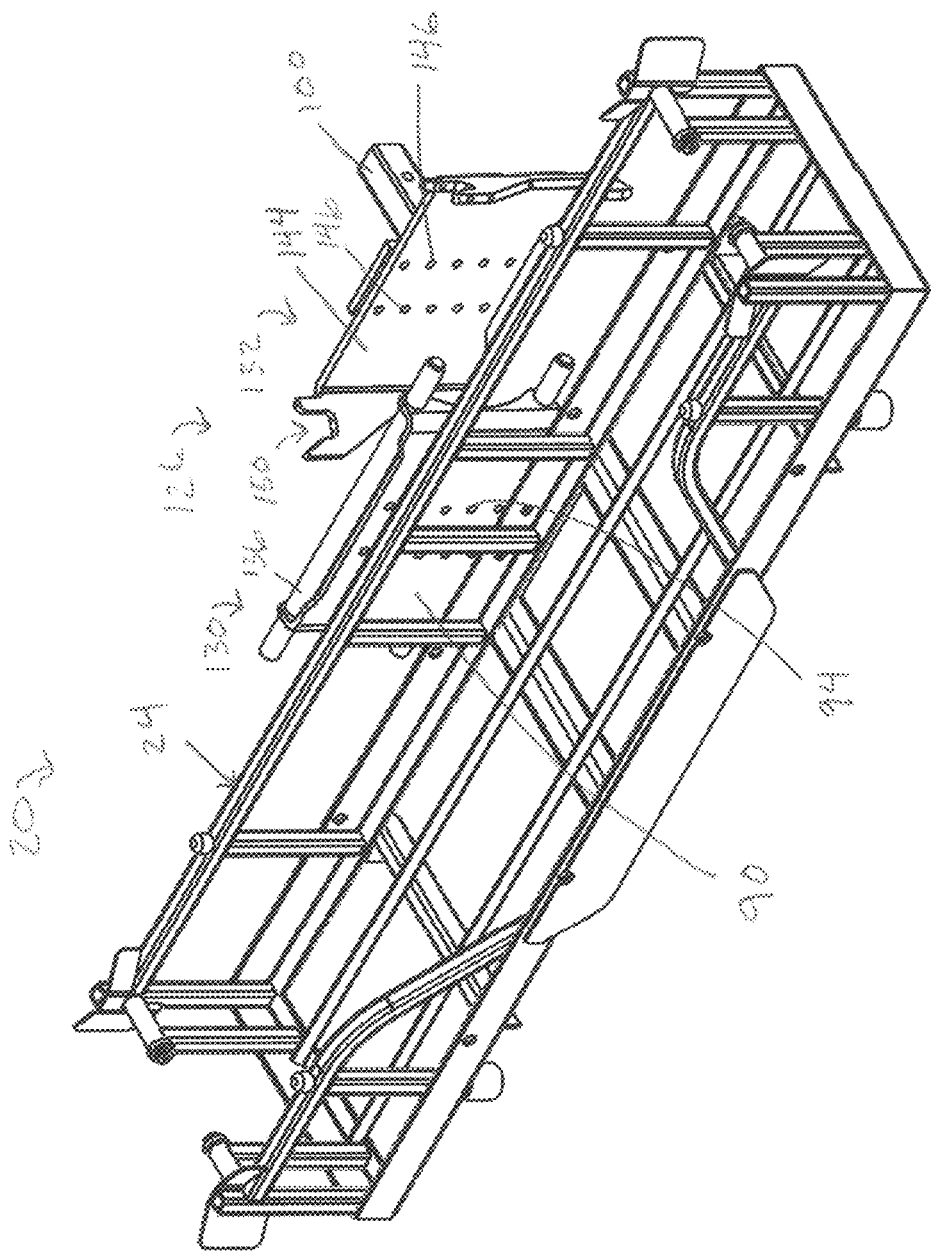
FIG. 13 is a front perspective view of another rumble strip cargo carrier and mounting assembly provided by the invention.
Figure 14:
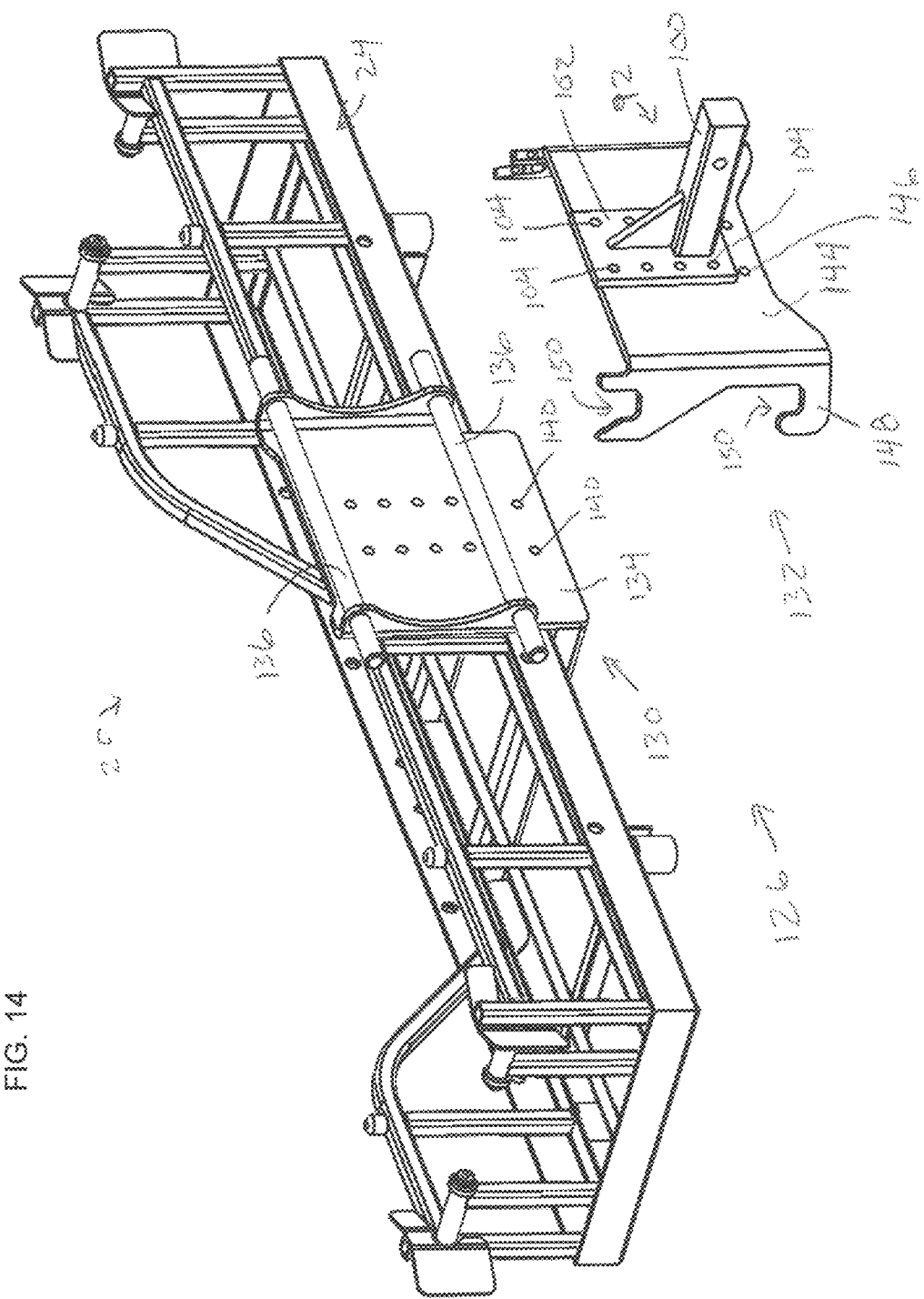
FIG. 14 is a rear perspective view of the rumble strip cargo carrier and mounting assembly of FIG. 13.
Figure 17:
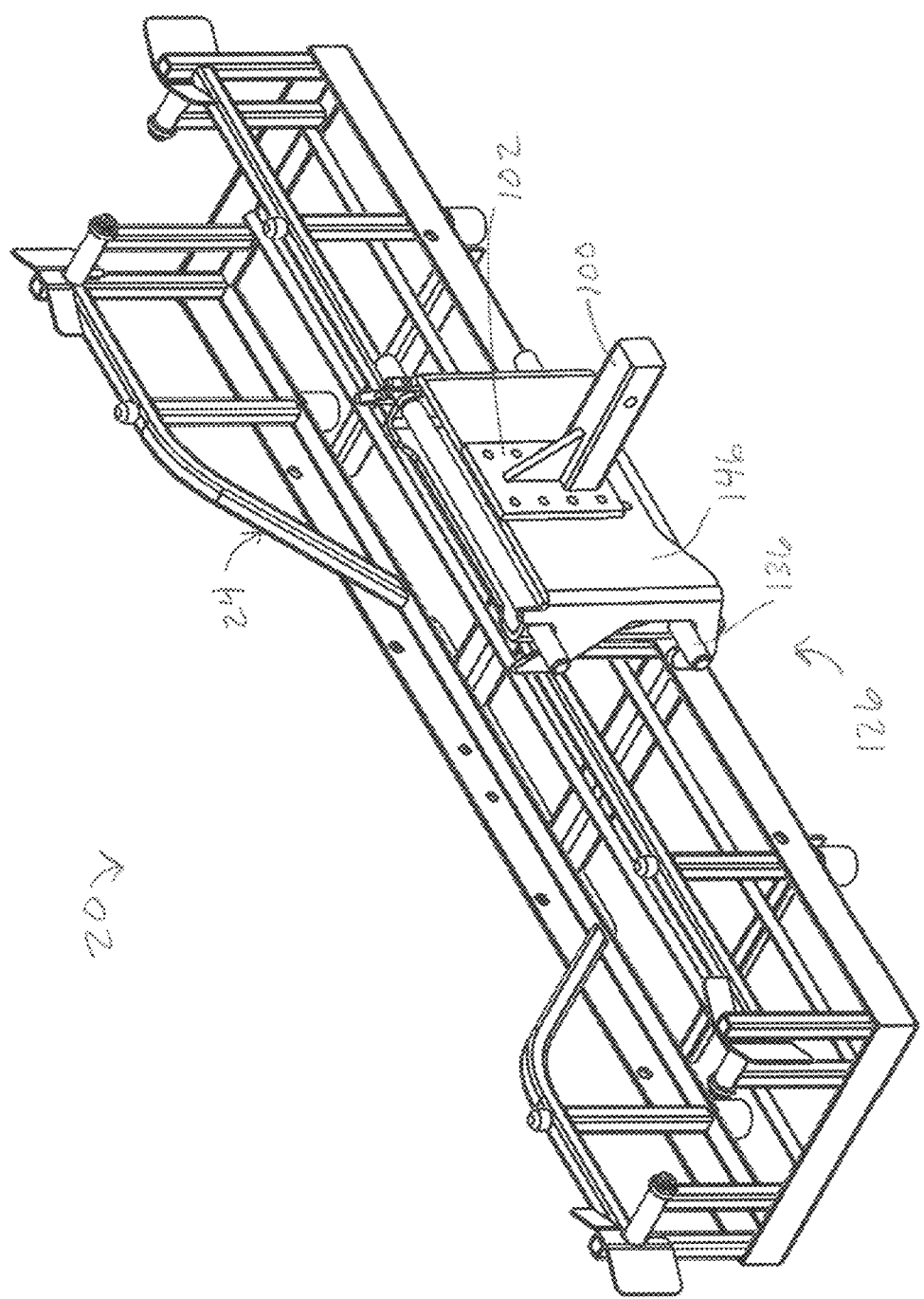
FIG. 17 is a rear perspective view of the rumble strip cargo carrier and mounting assembly of FIG. 13 in an assembled configuration.
Figure 18:
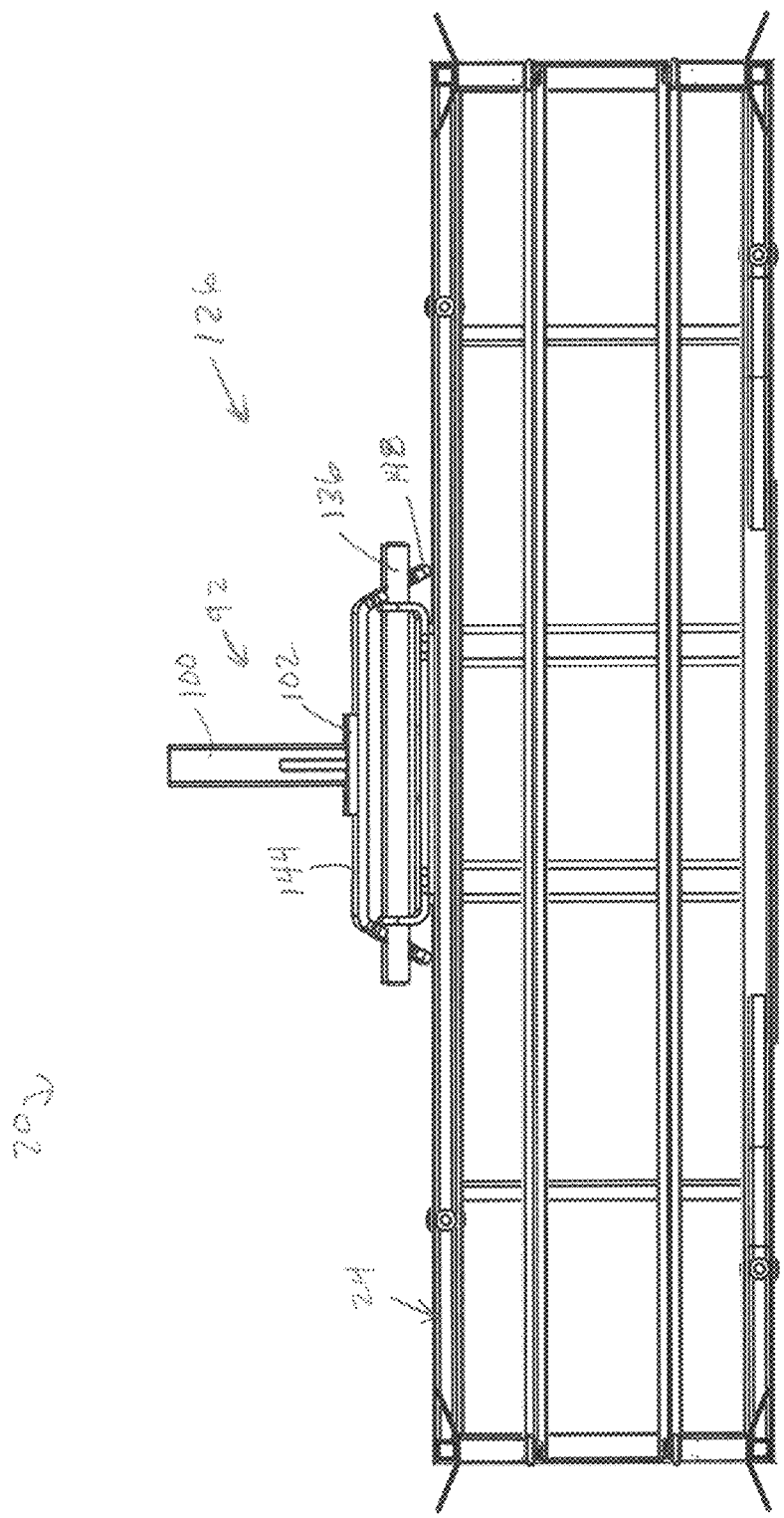
FIG. 18 is a top view of the rumble strip cargo carrier and mounting assembly of FIG. 17.
Figure 19:
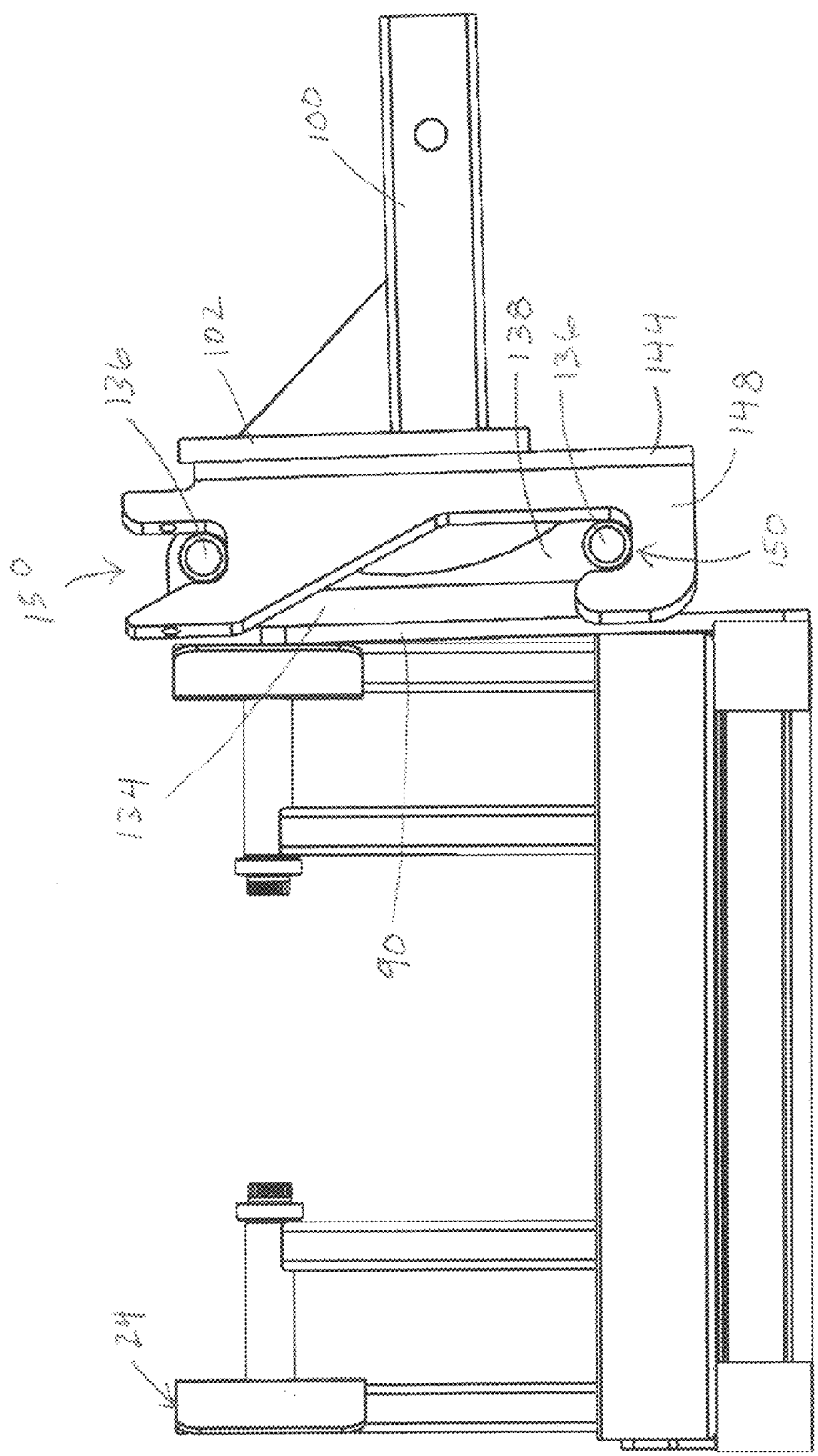
FIG. 19 is a side elevation view of the rumble strip cargo carrier and mounting assembly of FIG. 17.

Referring now to the drawings, in which like reference characters refer to like parts throughout the views, and initially to FIGS. 1 to 4, the present invention provides an improved vehicle-mountable cargo carrier 20 for portable rumble strips 22. The rumble strip carrier 20 includes a basket 24 to support one or more rumble strips 22 and an associated mounting assembly 26 for mounting the rumble strip basket 24 to a hitch assembly of a vehicle (not shown).

The rumble strip carrier 20 provided by the invention may include one or more of the following features, separately or in combination: (1) a relief in a front side of the rumble strip basket 24 that facilitates lifting rumble strips 22 over the front side and into or out of the basket 24; (2) rotating elements on top of at least one of lateral sides or ends of the basket 24 that facilitate drawing rumble strips 22 lengthwise over the side of the basket 24; (3) a relief in a lateral side that facilitates reaching into the basket 24 to grasp an end of a rumble strip 22 when inserting or removing rumble strips 22 from the basket 24; (4) spaced-apart guide wings toward front and back sides of the basket 24 that extend above a lateral side or end to help guide rumble strips 22 lengthwise over the side into or out of the basket 24; (5) a mounting assembly 26 that is configured to selectively adjust the height of the basket 24 relative to a pintle portion of the mounting assembly 26, and thus a hitch assembly mounted to a vehicle (not shown); and (6) a basket 24 with features that facilitate stacking multiple baskets 24 for storage when not mounted to a vehicle. These features will be described further in the following description of exemplary embodiments.

A prior art portable rumble strip 22 is shown in FIG. 1. The rumble strip 22 has a rectangular shape with substantially flat top and bottom surfaces, relatively long opposing side edges 30, and relatively short opposing end edges 32, giving the rumble strip 22 a substantially greater length dimension than width dimension. Although the dimensions of each rumble strip 22 may vary, the rumble strip 22 desirably has sufficient length to reach across a single highway lane, which typically is about 11 feet (about 3.4 m) wide. The rumble strip 22 has a width of about 8 to 16 inches (about 20 to 41 cm). The rumble strips 22 also have sufficient thickness to create a noticeable audible and vibration warning to drivers of automotive vehicles, including trucks, when driven over the rumble strips 22, but not so severe as to alarm the drivers or cause any adverse effect on the stability of a vehicle. To that end, the rumble strip 22 generally has a thickness of about 0.5 to 1 inch (about 1.3 to 2.5 cm).

Suitable hand grip slots 34 typically are provided in each rumble strip 22 adjacent to one or both ends of the rumble strip 22. The hand grip slots 34 make it easier to pick up each rumble strip 22 so that it can be lifted or dragged in a longitudinal direction (parallel to the length dimension of the side edges 30) as it is deployed or retrieved. To facilitate deploying the rumble strips 22 in sufficient length to span the roadway while providing a more compact form for storage and transport, the rumble strips 22 may have multiple sections 36 that are secured together end-to-end, either as they are deployed or via a previously-applied hinged connection. Hand grip slots 34 may be provided at each end of each rumble strip section 36.

Portable rumble strips 22 typically are made of a suitable high strength, weather-resistant polymeric material. Because polymeric materials alone generally are not heavy enough to hold a portable rumble strip 22 in place under heavy traffic at highway speeds, metal plates may be embedded in the rumble strip 22 to provide the necessary ballast to keep each rumble strip 22 in place. This added weight makes the rumble strip 22 heavier, however. Some rumble strips 22 may weigh as much as 100 pounds (about 45 kg) or more, which may make them more difficult for one person to deploy and retrieve from a site. Exemplary rumble strips are described in U.S. Pat. No. 7,736,087 and U.S. Patent Application Publication No. 2015/030390A1, both of which are hereby incorporated herein by reference.

The basket 24 of the rumble strip carrier 20 shown in FIGS. 2 to 12 includes a frame 40 configured to receive and retain one or more, and typically multiple, portable rumble strips 22 for storage and transport. The frame 40 defines bottom, front, back, and lateral sides of the basket 24. Specifically, the frame 40 includes frame members 42 that define a bottom support surface, also referred to as a bottom side or bottom wall 44 on which the rumble strips 22 may be stacked. The frame members 42 may be linear frame members, such as bars or rods, (as shown), and may be solid or tubular, with any cross-section that provides sufficient strength. Alternatively or in addition to linear frame members, the frame members 42 may include planar frame members in the form of sheets, although generally, and particularly if used to form the bottom wall 44, the planar sheet should be perforated to allow water to pass through. Accordingly, the bottom wall 44 may be provided by a perforated metal mesh, for example, which can provide a continuous support surface, while still allowing for the passage of dirt and water through the bottom wall 44.

The frame 40 of the basket 24 also includes frame members 42 that define a front side or wall 46, a back side or wall 48, and a pair of lateral sides or side walls 50. The relatively shorter, laterally-spaced side walls 50 connect the relatively longer front and back walls 46 and 48. The side walls 50 alternatively may be referred to as sides, ends, or end walls 50. The front, back, and side walls 46, 48, and 50 extend in a common direction transverse to, and generally in an upwardly direction from, the bottom wall 44. The frame 40 thus defines a parallelpiped, such as a rectangular, volume, within which rumble strips 22 may be received and retained during storage and transport. Similar to the bottom wall 44, the front wall 46, the back wall 48, and the lateral side walls 50 also may be formed from planar sheets or a grid of upright and transverse linear frame members 42 (as shown) arranged to retain the rumble strips 22 within the basket 24. In either case, straps, ropes, or other tie-downs may be used to further secure the rumble strips 22 in the basket 24.

Portable rumble strips 22 tend to be heavy, yet flexible. When initially loaded into the rumble strip carrier 20, typically a worker at each end of the rumble strip 22 grabs a respective end of the rumble strip 22 and lifts it over the front side 46 of the rumble strip basket 24. When the workers lift the ends, the flexible rumble strip 22 sags in the middle where it is unsupported. The front wall 46 of the frame 40 and basket 24 is relieved or has a relief portion in a center section 52 (also referred to as a central portion 52) to accommodate the sag in the rumble strip 22, making it easier to lift and load rumble strips 22 into or out of the basket 24 from the front side, over the front wall 46. In the illustrated embodiment, a top edge of the front wall 46 is defined by frame members 42, such as rails, that angle downwardly toward the center section 52, moving inwardly from the side walls 50, to define the relief portion 52. The remaining portions of the front wall 46, at lateral ends toward the side walls 50, are configured to provide sufficient structure to hold the rumble strips 22 in the basket 24.

The frame members 42 that form the side or end walls 50 also have relieved portions or relief portions, leaving a center section 54 of the side walls 50 open to facilitate reaching into the basket 24 to grasp an end of a rumble strip 22. This open or relieved center section 54 of the side walls 50 makes it easier to reach through the side wall 50 to grab an end of the rumble strip 22, and to lift and withdraw the rumble strip 22 from the basket 24 or to return an end of the rumble strip 22 to the basket 24, particularly a rumble strip 22 lower in the basket 24, closer to the bottom wall 44.

As mentioned above, the top edge of the side walls 50 are provided with features that facilitate drawing a rumble strip 22 lengthwise over the side wall 50, out of the rumble strip basket 24 for placement, or back into the basket 24 when being retrieved. These features allow a single worker, including a relatively weaker worker, to pull a relatively heavy rumble strip 22 into or out of the basket 24 with less effort than lifting the entire rumble strip 22 before taking it out of or returning it to the basket 24.

Accordingly, the rumble strip basket 24 may further include features that make it easier to withdraw or return rumble strips 22 over one or both of the lateral side walls 50 of the basket 24. These features may include friction-reducing surfaces or one or more rotating members 60, such as rollers or bearings, as shown, that rotate about respective horizontal axes at the top of one or more of the side walls 50 to facilitate pulling a rumble strip 22 into or out of the basket 24. The rotating members 60 may be used with or without the open or relieved center section 52 of the side walls 50. Gravity can assist once a sufficient weight of rumble strip 22 has been pulled over the side wall 50. In the illustrated embodiment, the rotating members 60 include a pair of spaced-apart rollers or bearings, which may be stainless steel, for example, for increased weather resistance. The illustrated rotating members 60 are spaced across respective sides of the relieved center section 52 of the side wall 50.

Providing rotating members 60 at both sides of the basket 24 allows rumble strips 22 to be deployed over either side wall 50 across a roadway. But if hinged rumble strips are used, the hinged portions should be pre-positioned on the proper side, such as adjacent the side wall 50 over which the rumble strip 22 is to be drawn, to unfold as the leading end of the rumble strip 22 is pulled from the basket 24. For a folded rumble strip 22, the leading end may need to be swung from one side of the basket 24 over the top of the opposing side wall 50 before pulling the rest of the rumble strip 22 over the side wall 50 and out of the basket 24. Folded rumble strips having different numbers of hinged sections may need to be positioned in different ways.

Another feature that facilitates drawing rumble strips 22 into or out of the basket 24 includes a pair of upright guide wings 64 or fins that extend above one or both of the lateral sides 50 of the basket 24. The guide wings 64 are spaced apart and are located toward the front and back walls 46 and 48, respectively, adjacent the side wall 50 with end portions of the guide wings 64 angled outwardly, away from the opposing guide wing 64, to define a channel that helps to guide a rumble strip 22 over the side wall 50. The guide wings 64 also help to keep the rumble strip 22 in contact with the top of the side wall 50 as it is being withdrawn from the basket 24 or returned to the basket 24. The guide wings 64 further help to keep the rumble strips 22 aligned with the front and back walls 46 and 48 of the basket 24. When the guide wings 64 are used in conjunction with the rotating members 60, the guide wings 64 also help to keep the rumble strip 22 from sliding sideways off the top of the side wall 50 and out of contact with the rotating members 60. The guide wings 64 also make it easier to align the rumble strip basket 24 with the location where the rumble strip 22 is to be deployed, and pulling the rumble strip 22 from the basket 24 into the desired location helps to minimize the time needed for a worker to deploy or to retrieve the portable rumble strips 22 from a roadway.

The rumble strip carrier 20 also may include reflective elements (not shown), such as reflectors or reflective tape, mounted to the frame 40 or the front, back or side walls 44, 46, 48, and 50 of the basket 24, and alternatively or additionally may include lights (not shown) mounted to the frame 40. The lights may be powered through a battery or other source of electrical power mounted on the carrier, or may be coupled to a wiring harness that supplies power from the vehicle, as such wiring harnesses commonly accompany a vehicle hitch assembly for use when towing another vehicle.

The hitch assembly on a vehicle typically includes a sleeve or receiver securely mounted to a front end or a rear end of the vehicle to position the rumble strip carrier 20 proximate a respective front or rear bumper of the vehicle. This arrangement provides convenient access to the basket 24 for loading and unloading portable rumble strips 22. As described above, the rumble strip carrier 20 also may be used for storing the rumble strips 22 when not in use, and the basket 24 or the entire rumble strip carrier 20 may be removed from the vehicle for such purpose. A lift truck, such as a vehicle commonly referred to as a forklift, may be used to support the basket 24 or the entire rumble strip carrier 20 for mounting to or removing the basket 24 or the rumble strip carrier 20 from the hitch assembly, or for stacking multiple rumble strip carriers 20, or just the rumble strip baskets 24, on top of one another or on elevated storage shelves.

The rumble strip carrier 20 further includes features that facilitate using the carrier 20 or just the basket 24 off of a vehicle to store rumble strips 22 until needed.

The illustrated rumble strip carrier 20 has multiple feet 70 on a bottom side of the basket 24 and corresponding locating elements 72 on a top side of the basket 24 that may cooperate with the feet 70 of another basket 24 to facilitate stacking multiple rumble strip carriers 20 or baskets 24, with or without accompanying rumble strips 22, for storage when dismounted from the vehicle. The feet 70 thus act as stacking pegs. The feet 70 also may elevate the bottom surface of the basket 24 to facilitate receipt of the forks of a forklift or other lifting mechanism under the basket 24 to pick up the basket 24 or the rumble strip carrier 20. The forklift can then move the basket 24 or the rumble strip carrier 20 to a waiting vehicle and support it for mounting to the vehicle.

To facilitate mounting the rumble strip basket 24 at an optimum height relative to the vehicle hitch, bumper, and lights, the mounting assembly 26 allows the basket 24 to be mounted at any one of multiple heights relative to the vehicle's hitch assembly. A first embodiment of the mounting assembly 26 is shown in FIGS. 2 to 12, and another embodiment is shown in FIGS. 13 to 19. In both embodiments, however, the basket 24 already described generally remains the same.

In the first embodiment of the mounting assembly 26, shown in FIGS. 2 to 12, the mounting assembly 26 includes a basket mounting plate 90 secured to or incorporated into the frame 40 of the rumble strip basket 24, and a pintle mounting bracket 92, also referred to as the pintle bracket 92. The basket mounting plate 90 typically is a flat plate mounted to or incorporated into the back wall 48 of the basket 24. The basket mounting plate 90 also may have a plurality of vertically-spaced holes or apertures 94 to adjust the height of the basket 24 relative to a vehicle hitch assembly and thus to the vehicle, its lights, identifying plates, exhaust, bumpers, tailgate, fuel port, or other particular feature of the vehicle.

Vehicle hitch assemblies typically include a tubular receiver, often a standardized size and typically rectangular or square. The pintle mounting bracket 92 includes a pintle 100 configured for receipt in a standard receiver of a vehicle hitch assembly, and a pintle mounting plate 102 fixed to one end of the pintle 100, generally perpendicular to the longitudinal extent of the pintle 100. The pintle 100 thus has a corresponding cross-section matching the shape of the receiver. The pintle mounting plate 102 typically presents a surface that corresponds to the shape of the facing surface of the basket mounting plate 90. Mating flat surfaces are the simplest, but other mating surface shapes that allow for vertical adjustment are possible. The pintle mounting plate 102 also includes one or more holes or apertures 104 adapted to align with corresponding holes 94 in the basket mounting plate 90 at any of multiple relative vertically-offset positions.

Thus the pintle bracket 92 is removably connected to the basket mounting plate 90 through one or more fasteners (not shown) that extend through holes 104 in the pintle mounting plate 102 and respective ones of a plurality of vertically-arrayed holes 94 in the basket mounting plate 90. The position of the basket mounting plate 90, and thus the rumble strip basket 24, relative to the pintle bracket 92, and therefore the hitch assembly and the vehicle, may be selectively adjusted by aligning respective holes 104 of the pintle mounting plate 102 with different corresponding ones of the plurality of vertically-spaced holes 94 in the basket mounting plate 90 and securing the pintle mounting plate 102 and the basket mounting plate 90 together with one or more fasteners, such as bolts inserted in threaded holes in the basket mounting plate 90 or passing through to threaded nuts that can be tightened to secure the bolts in place.

While a height adjustment probably would only be necessary in practice when mounting the rumble strip carrier 20 to a new vehicle, the mounting assembly 26 shown in FIGS. 2 to 12 probably would be used and stored with the mounting assembly 26 mounted to the rumble strip basket 24 at all times, except during the adjustment.

The present invention also provides an alternative mounting assembly 126 that provides a quicker attachment and release of the rumble strip basket 24 using a modified basket mounting bracket 130 and complimentary pintle bracket 132 shown in FIGS. 13 to 19. Consequently, the basket mounting bracket 130 and the pintle bracket 132 include complementary features that allow the rumble strip basket 24 to be lifted up and removed from the pintle bracket 132, such as with a forklift, and similarly mounted by lowering the basket 24 into engagement with the pintle bracket 132. More particularly, the mounting assembly 126 includes the previously-described basket mounting plate 90 and the pintle bracket 92 with its pintle 100 and pintle mounting plate 102. So no further description of those components is necessary here.

The basket mounting bracket 130 includes a catch plate 134 mounted to the basket mounting plate 90. The catch plate 134 includes at least one horizontal catch bar 136 parallel to and spaced from the back wall 48 outside the basket 24. The illustrated embodiment includes a pair of vertically-displaced catch bars 136. The catch bars 136 are supported by openings in lateral inwardly-turned, outwardly-extending portions 138 of the catch plate 134. The catch plate 134 also includes one or more holes or apertures 140 adapted to align with corresponding holes 94 in the basket mounting plate 90 at multiple vertically-offset positions to facilitate a desired height position.

Similarly, the pintle bracket 132 includes the pintle 100 and the pintle mounting plate 102 described above. The pintle bracket 132 further includes a pintle catch bracket 144 mounted to the pintle mounting plate 102. The pintle catch bracket 144 has a plurality of vertically-spaced holes 146 through which the pintle catch bracket 144 is secured to the pintle mounting plate 102 at a desired relative vertical position. The pintle catch bracket 144 further includes lateral inwardly-turned portions 148 that have a pair of upwardly-facing notches 150 configured to receive and retain the catch bar 136. Accordingly, the pair of notches 150 also may be referred to as catches. The illustrated embodiment thus includes two vertically-displaced pairs of vertically-aligned notches 150 for receiving respective ones of the catch bars 136 mounted to the basket 24.

A forklift can be used to lift the rumble strip basket 24 and then lower it to engage the catch bars 136 in the notches 150 of the pintle bracket 132. A locking member or strap can be used to hold the basket 24 to the pintle bracket 132 together in use, but the weight of the rumble strip basket 24 may be sufficient. This arrangement may make it easier to mount a basket 24 filled with heavy rumble strips on a vehicle, because the pintle 100 can be mounted in the receiver of the vehicle's hitch assembly in advance rather than trying to maneuver a loaded rumble strip carrier 20 to align the pintle 100 with the receiver of the hitch assembly. This mounting assembly 126 still provides a way to adjust the relative height of the rumble strip basket 24 and the pintle 100. The basket catch plate 134 with its catch bars 136 and the pintle catch bracket 144 may be supplied as a kit for modifying the previously-described mounting assembly 26 to include the quick-release features.

The present invention thus provides alternative mounting assemblies 26 (FIG. 6) and 126 (FIG. 14) that facilitate removably mounting the basket 24 at any of a multitude of vertical positions to allow selective positioning of the rumble strip basket 24 relative to the pintle 100 and thus the vehicle, particularly relative to the vehicle's bumper and lights.

In summary, the present invention provides a cargo carrier 20 for portable rumble strips 22 that is mountable to a hitch assembly for a vehicle. The cargo carrier 20 includes a basket 24 configured to receive and retain a portable rumble strip 22 for storage and transport, and a mounting assembly 26 or 126 that includes a pintle 100 adapted to be received in a receiver of the hitch assembly. The basket 24 includes a frame 40 that has frame elements 42 that define a bottom wall 44, relatively long front and back walls 46 and 48, and relatively short side walls 50 that connect the front wall 46 and the back wall 48. The front wall 46, the back wall 48, and the side walls 50 extend from respective sides of the bottom wall 44 in a common direction. The rumble strip carrier 20 further may include one or more of the following features, separately or in any combination: (1) a front wall 46 with a relieved central section 52; (2) one or more rotating elements 60 on top of at least one of lateral side walls 50; (3) at least one of the side walls 50 having a relieved center section 54; (4) spaced-apart guide wings 64 positioned toward front and back walls 46 and 48 of the basket 24 that extend above the side walls 50; (5) a mounting assembly 26 or 126 that is configured to selectively adjust the height of the basket 24 relative to the pintle 100; and (6) a basket 24 with features, such as feet 70 and locating elements 72, that facilitate stacking multiple baskets 24 for storage when not mounted to a vehicle.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiments of the invention. In addition, while a particular feature of the invention may have been disclosed with respect to only one embodiment, such feature may be combined with one or more other features as may be desired or advantageous to any given or particular application.

The invention claimed is:

1. A cargo carrier for portable rumble strips that is mountable to a receiver of a hitch assembly mountable to a vehicle, comprising:
a basket configured to receive and retain one or more portable rumble strips for storage and transport, the basket including a frame that defines a volume for receiving one or more rumble strips, and the frame includes one or more frame elements that define a bottom wall, a relatively long front wall, a relatively long back wall, and relatively short laterally-spaced side walls that connect the front wall and the back wall, where the front wall, the back wall, and the side walls extend from respective sides of the bottom wall in a common direction; and
a mounting assembly that includes a pintle bracket connectable to the basket, the pintle bracket including a pintle adapted to be received in a receiver of a hitch assembly mountable to a vehicle;
where the basket further includes one or more rotating elements at a top of at least one of the side walls to facilitate drawing rumble strips lengthwise over the at least one side wall into or out of the basket; and
where the side walls include relieved portions that facilitate reaching into the basket to grasp an end of a rumble strip, and the relieved portions have a height that is less than a height of the side walls.

2. A cargo carrier as set forth in claim 1, where the one or more rotating elements at the top of at least one of the side walls includes stainless steel rollers.

3. A cargo carrier as set forth in claim 1, where the one or more rotating elements at the top of at least one of the side walls includes a pair of spaced apart rollers.

4. A cargo carrier as set forth in claim 1, where the basket further includes a pair of spaced-apart guide wings positioned toward the front and back walls, the guide wings extending above the adjacent side wall to help guide rumble strips lengthwise over the side wall into or out of the basket.

5. A cargo carrier as set forth in claim 1, where the basket includes features that facilitate stacking baskets for storage when not mounted on a vehicle.

6. A cargo carrier as set forth in claim 5, where the features that facilitate stacking include feet mounted to the bottom wall of the basket and corresponding locating elements on a top side of the basket to receive the feet of another rumble strip carrier.

7. A cargo carrier as set forth in claim 1, where the front wall of the basket is relieved in a central portion to facilitate lifting rumble strips over the front wall and into or out of the basket, and the relieved central portion has a height that is less than a height of the front wall.

8. A cargo carrier as set forth in claim 1, where the basket includes a mounting plate having a plurality of vertically-spaced openings, and the pintle bracket includes a pintle mounting plate attached to the pintle, where the pintle mounting plate includes at least one opening, such that the opening in the pintle mounting plate is selectively alignable with one of the plurality of openings in the basket mounting plate and is securably fastenable with a fastener receivable in the aligned openings, whereby the basket mounting plate and the pintle mounting plate are securable together at any one of multiple vertically-displaced positions to vary the height of the basket relative to pintle.

9. A cargo carrier as set forth in claim 8, where the mounting assembly further includes a catch plate mounted to the basket mounting plate, the catch plate having a horizontal catch bar parallel to the back wall of the basket, and the pintle bracket includes one or more catches adapted to receive and hold the catch bar to secure the basket to the pintle bracket.

\* \* \* \* \*